United States Patent
Sato

(10) Patent No.: US 7,666,288 B2
(45) Date of Patent: *Feb. 23, 2010

(54) APPARATUS FOR ELECTRODEIONIZATION OF WATER

(75) Inventor: Shin Sato, Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 955 days.

This patent is subject to a terminal disclaimer.

(21) Appl. No.: 10/791,829

(22) Filed: Mar. 4, 2004

(65) Prior Publication Data

US 2004/0178075 A1  Sep. 16, 2004

Related U.S. Application Data

(63) Continuation of application No. PCT/JP03/07973, filed on Jun. 24, 2003.

(30) Foreign Application Priority Data

Jul. 8, 2002 (JP) ............................. 2002-198807

(51) Int. Cl.
*B01D 61/48* (2006.01)
(52) U.S. Cl. ...................................... 204/632
(58) Field of Classification Search ................. 204/632
See application file for complete search history.

(56) References Cited

U.S. PATENT DOCUMENTS

| 5,292,422 | A | * | 3/1994 | Liang et al. | 204/632 |
| 5,593,563 | A | | 1/1997 | Denoncourt et al. | |
| 6,248,226 | B1 | | 6/2001 | Shinmei et al. | |
| 6,274,019 | B1 | * | 8/2001 | Kuwata | 204/632 |
| 6,649,037 | B2 | * | 11/2003 | Liang et al. | 204/632 |
| 6,733,646 | B2 | * | 5/2004 | Sato et al. | 204/524 |

(Continued)

FOREIGN PATENT DOCUMENTS

CA          2 461 558        4/2003

(Continued)

*Primary Examiner*—Arun S Phasge
(74) *Attorney, Agent, or Firm*—Manabu Kanesaka

(57) ABSTRACT

Silica and boron are particularly removed at high rate in processing by the electrodeionization apparatus. An electrodeionization apparatus has an anolyte compartment 17 having an anode 11, a catholyte compartment 18 having a cathode 12, concentrating compartments 15, and desalting compartments 16. The concentrating compartments 15 and the desalting compartments 16 are alternately formed between the anolyte compartment 17 and the catholyte compartment 18 by alternately arranging a plurality of anion-exchange membranes 13 and a plurality of cation-exchange membranes 14. The desalting compartments 16 and the concentrating compartments 15 are filled with ion-exchanger. The anion exchanger/cation exchanger volume ratio is 8/2 to 5/5. Electrode water flows into the anolyte compartment 17 and the catholyte compartment 18. Concentrated water is introduced into the concentrating compartments 15. Raw water is fed into the desalting compartment 16 to produce the deionized water from the desalting compartment 16. Water containing silica or boron at a lower concentration than the raw water is introduced into the concentrating compartments 15 as the concentrated water in a direction from a side near an outlet for the deionized water toward a side near an inlet for the raw water of the desalting compartments 16. At least a part of concentrated water flowing out of the concentrating compartments 15 is discharged out of a circulatory system.

6 Claims, 8 Drawing Sheets

U.S. PATENT DOCUMENTS 6,824,662 B2 * 11/2004 Liang et al. .................. 204/524

FOREIGN PATENT DOCUMENTS

| | | |
|---|---|---|
| EP | 1 222 954 | 7/2002 |
| JP | 4-72567 | 11/1992 |
| JP | 6-506867 | 8/1994 |
| JP | 8-150326 | 6/1996 |
| JP | 2699256 | 9/1997 |
| JP | 10-43554 | 2/1998 |
| JP | 2751090 | 2/1998 |
| JP | 2001-314868 | 11/2001 |
| JP | 2002-205069 | 7/2002 |
| WO | WO 92/11089 | 7/1992 |
| WO | WO 97/46492 | 12/1997 |

* cited by examiner

APPARATUS FOR ELECTRODEIONIZATION OF WATER

CROSS REFERENCE TO RELATED APPLICATION

This is a continuation application of PCT/JP03/07973 filed on Jun. 24, 2003.

FIELD OF THE INVENTION

The present invention relates to an electrodeionization apparatus, in particular to an electrodeionization apparatus improved in rate of removal of silica and boron.

BACKGROUND OF THE INVENTION

Deionized water is used for various purposes, for example, in plants such as for semiconductor production and liquid crystal display production, in industrial facilities such as for pharmaceutical industry, food industry, and electric power industry, even in households, and in laboratories. Electrodeionization apparatuses are frequently used to produce deionized water as described in Japanese Patent No. 1782943, Japanese Patent No. 2751090, and Japanese Patent No. 2699256. A conventional electrodeionization apparatus of FIG. 2 includes electrodes which consist of an anode 11 and a cathode 12, anion-exchange membranes (A membranes) 13 and cation-exchange membranes (C membranes) 14. The membranes are alternately arranged in such a manner as to alternately form concentrating compartments 15 and desalting compartments 16 between the anode and the cathode. The desalting compartments 16 are filled with anion-exchanger and cation-exchanger made of ion exchange resin, ion exchange fibers, or graft exchanger. In the desalting compartments 16, the anion-exchanger and cation-exchanger are in the mixed state or multiple-layered state. In FIG. 2, "17" represents an anolyte compartment, and "18" represents a catholyte compartment.

Ions flowing into the desalting compartments 16 react with the ion exchanger according to the affinity, concentration, and mobility of the ions and move through the ion exchanger in a direction of potential gradient. The ions further pass through the membranes to hold neutralization of charges in all of the compartments. The ions decrease in the desalting compartments 16 and increase in the concentrating compartments 15 because of the semi-permeability of the membranes and the polarities of potential gradient. This means that cations permeate the cation-exchange membranes 14 and anions permeate the anion-exchange membranes 13 so that the cations and anions are concentrated in the concentrating compartments 15. Therefore, deionized water (pure water) as product water is recovered from the desalting compartments 16.

Electrode water flows through the anolyte compartment 17 and the catholyte compartment 18. The water flowing out of the concentrating compartments 15 (concentrated water) and having high ion concentration is as the electrode water in order to ensure the electric conductivity.

Raw water is introduced into the desalting compartments 16 and the concentrating compartments 15. Deionized water (pure water) is taken out from the desalting compartments 16. Concentrated water in which ions are concentrated is discharged from the concentrating compartments 15. A part of the concentrated water is circulated into the inlets of the concentrating compartments 15 by a pump (not shown) in order to improve the product water recovery. Another part of the concentrated water is supplied to the inlet of the anolyte compartment 17. The reminder of the concentrated water is discharged as waste water out of a circulatory system in order to prevent the ion concentration in the circulatory system. Water flowing out of the anolyte compartment 17 is supplied to the inlet of the catholyte compartment 18. Water flowing out of the catholyte compartment 18 is discharged as waste water out of the circulating system.

The pH in the anolyte compartment 17 is lowered due to $H^+$ generated by dissociation of water. On the other hand, the pH in the catholyte compartment 18 is increased due to generation of $OH^-$. Thus, the acid water flowing out of the anolyte compartment 17 is introduced into the catholyte compartment 18 so that alkalinity in the catholyte compartment 18 can be neutralized, thereby eliminating damages due to scale formation.

There have been various reports indicating that the quality of the product water can be affected by the concentrated water in the above conventional electrodeionization apparatus. Filling activated carbon or ion-exchange resin into electrode compartments is disclosed in U.S. Pat. No. 5,868,915.

The above conventional electrodeionization apparatus do not remove silica and boron at extremely high ratio. For example, it is very difficult to remove silica at a rate of removal of 99.9 to 99.99% or higher.

There have been reports indicating that the concentrated water affects the product water, but there have been no reference to the relationship to silica and boron. Filling activated carbon or ion-exchange resin into electrode compartments can reduce the electrical resistance, but it can not reduce silica and boron.

OBJECTS AND SUMMARY OF THE INVENTION

It is an object of the present invention to provide an electrodeionization apparatus which removes silica and boron at extremely high ratio so as to produce deionized water having high quality.

An electrodeionization apparatus of the present invention has an anolyte compartment having an anode, a catholyte compartment having a cathode, concentrating compartments, and desalting compartments. The concentrating compartments and the desalting compartments are alternately formed between the anolyte compartment and the catholyte compartment by alternately arranging anion-exchange membranes and cation-exchange membranes. The desalting compartments are filled with ion-exchanger, and the concentrating compartments are filled with ion-exchanger, activated carbon, or an electric conductor. Electrode water flows into the anolyte compartment and the catholyte compartment. Concentrated water flows into the concentrating compartments. Raw water flows into the desalting compartments and the deionized water flows out of the desalting compartments. The concentrated water includes silica or boron at a lower concentration than the raw water. The concentrated water flows into the concentrating compartments at a side near an outlet for the deionized water of the desalting compartment and flows out from the concentrating compartments at a side near an inlet for the raw water of the desalting compartment. At least a part of the concentrated water flowing out of the concentrating compartments is discharged out of the circulating system. The desalting compartments are filled with anion exchanger and cation exchanger in such a manner that the volume ratio of the anion exchanger to the cation exchanger becomes 8/2 to 5/5.

By introducing concentrated water containing silica or boron at a lower concentration than the raw water into the desalting compartments at a side near the outlet for the deionized water (product water) in a direction toward a side near the inlet for the raw water, the silica or boron concentration of product water is significantly decreased.

Filling the desalting compartments, preferably both the desalting compartments and the concentrating compartments with the anion exchanger and the cation exchanger in such a manner that the anion exchanger/cation exchanger volume ratio becomes 8/2 to 5/5, respectively, reduces the electrical resistance in the desalting compartments or both the desalting compartments and concentrating compartments, thereby reducing the electrical power consumption.

In this case, the ratio of the anion exchanger is preferably made higher in a nearer position to the inlet for the raw water, so that the alkaline strength of water in the desalting compartments becomes higher in a nearer position to the inlet for the raw water, and thus it becomes easy to dissociate silica and boron, thereby improving the rate of removal of silica and boron.

In the present invention, at least one part of the anion exchanger is preferably made of a II type anion exchange resin, so that the rate of removal of carbonate ions can be improved.

In the present invention, the ion exchanger, preferably, is a salt type ion exchanger before the electrodeionization apparatus starts to run and is packed in the compartment in such a manner that the volume of the salt type ion exchanger occupies 95 to 100% of the compartment. The salt type ion exchanger changes to $H^+$ type or $OH^-$ type ion exchanger by ion exchange with $H^+$ or $OH^-$, representively, after the electrodeionization apparatus starts to run, and the volume of the ion exchanger becomes larger. As a result, the ion exchanger wholly contacts to the ion-exchange membrane, thereby reducing the electrical resistance and preventing the water from taking a shortcut in the compartment.

Since a large stress is applied to the frames enclosing each compartment such that the frames are bulged sideward due to the expansion of the ion exchanger, reinforcing members are preferably attached to the side portions of the electrodeionization apparatus.

BRIEF DESCRIPTION OF THE DRAWINGS

FIG. 3b is a schematic flow diagram of the apparatus of FIG. 3a;

DETAILED DESCRIPTION OF THE PREFERRED EMBODIMENTS

Hereinafter, embodiments of the present invention will be described with reference to the attached drawings.

Figure 1:
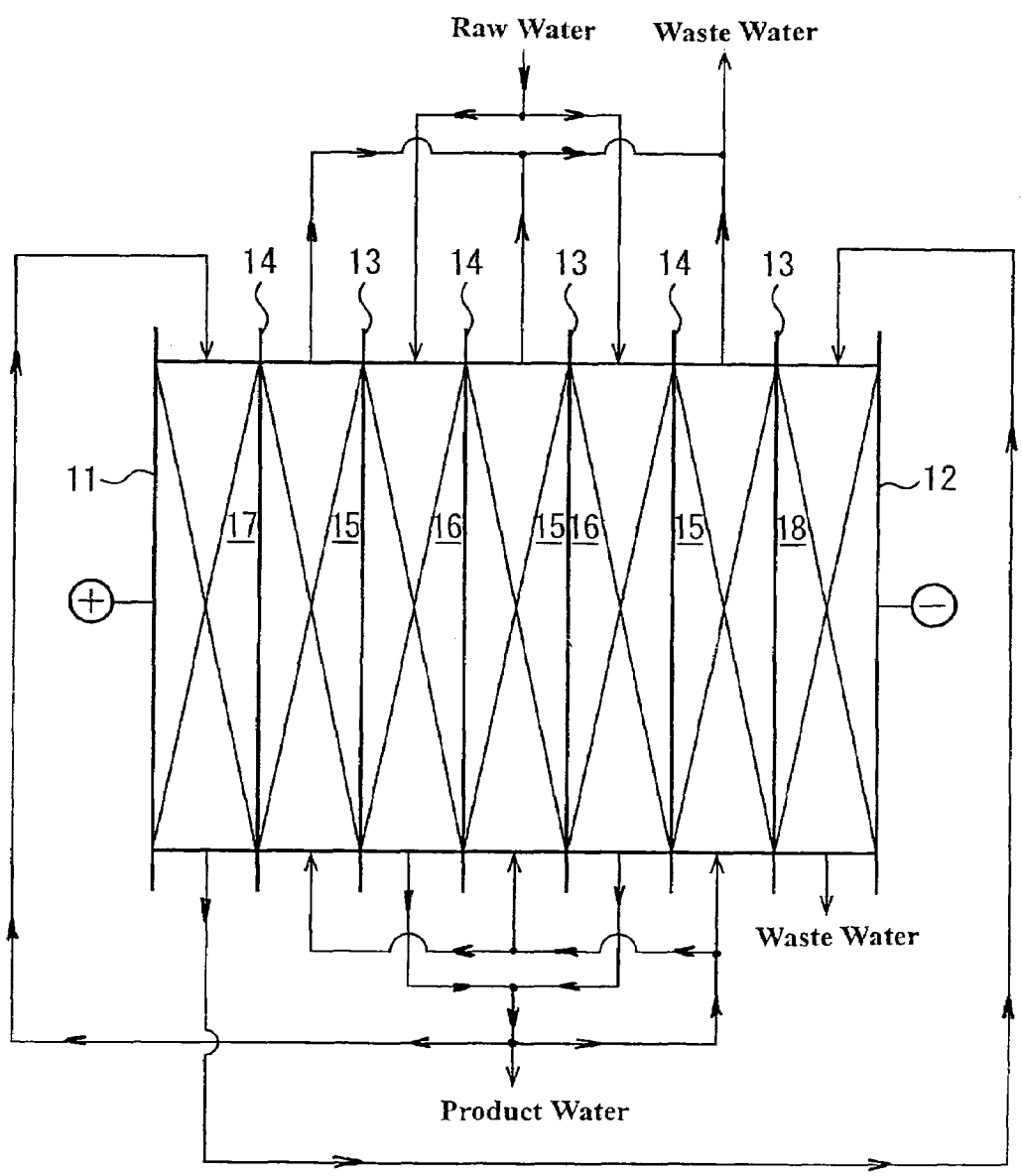
FIG. 1 is a schematic sectional view showing an electrodeionization apparatus according to an embodiment of the present invention.
Figure 2:
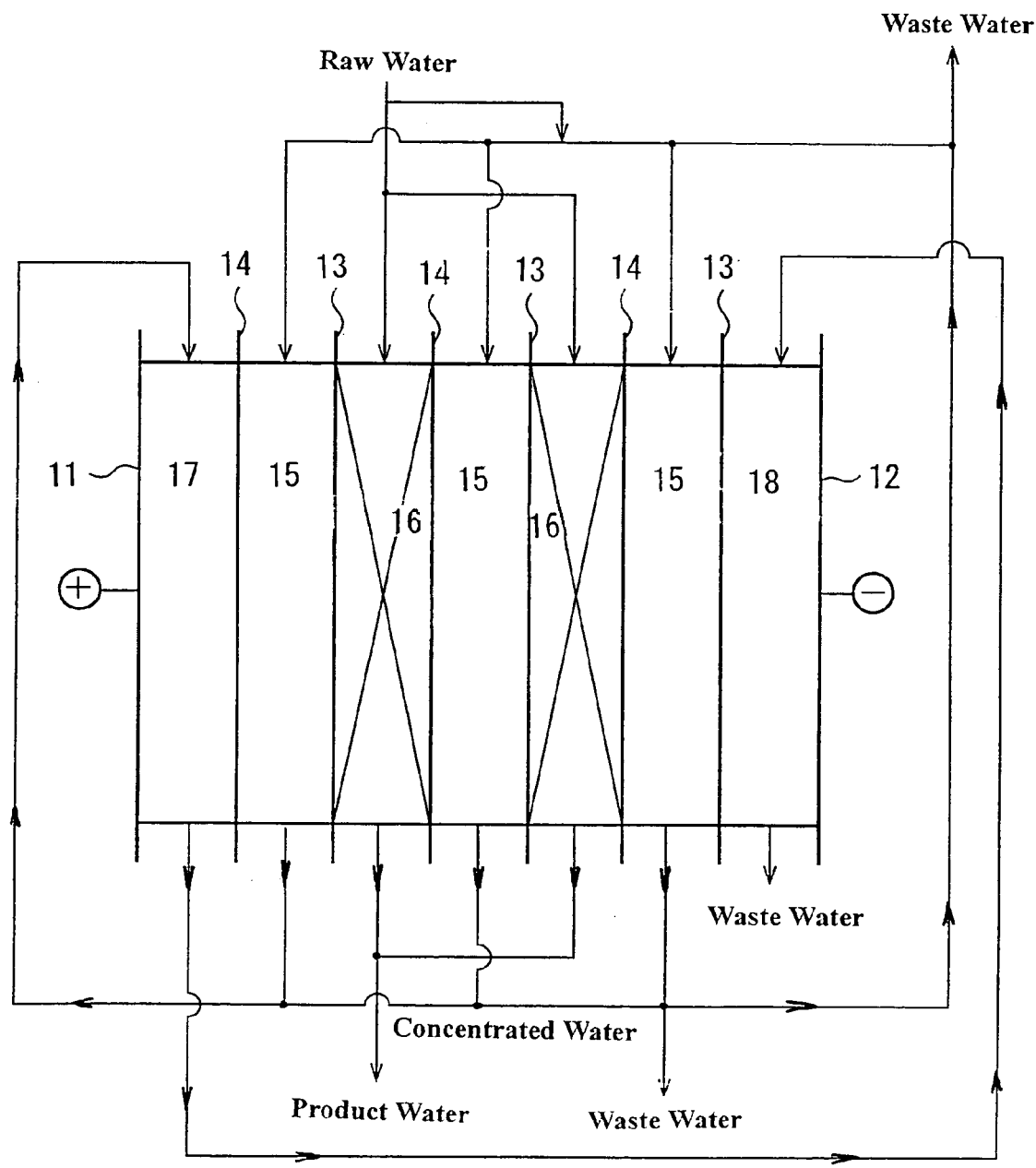
FIG. 2 is a schematic sectional view showing a conventional electrodeionization apparatus.

FIG. 1 is a schematic sectional view showing an electrodeionization apparatus according to an embodiment of the present invention. The electrodeionization apparatus shown in FIG. 1 has a plurality of anion-exchange membranes (A membranes) 13 and a plurality of cation-exchange membranes (C membranes) 14 which are alternately arranged between the electrodes (anode 11, cathode 12), concentrating compartments 15, and desalting compartments 16. The concentrating compartments 15 and the desalting compartments 16 are each defined between the membranes 13 and 14 and are therefore alternately arranged between the electrodes. The desalting compartments 16 are filled with anion-exchanger and cation-exchanger made of ion exchange resin, ion exchange fibers, or graft exchanger. In the desalting compartments 16, the anion-exchanger and cation-exchanger are filled in the mixed state or multiple-layered state. The mixing ratio (volume ratio) of the anion exchanger to the cation exchanger (anion exchanger/cation exchanger) in the desalting compartment 16 is 8/2 to 5/5.

The concentrating compartments 15, anolyte compartment 17, and catholyte compartment 18 are filled with electric conductive media such as ion exchanger, activated carbon, or metal. The concentrating compartments, in particular, are filled with the anion exchanger and the cation exchanger in such a manner that the mixing ratio (volume ratio) of the anion exchanger to the cation exchanger (anion exchanger/cation exchanger) becomes 8/2 to 5/5.

Filling the desalting compartments 16 and the concentrating compartments 15 with the anion exchanger and the cation exchanger in such a manner that the anion exchanger/cation exchanger volume ratio becomes 8/2 to 5/5, respectively, reduces the electrical resistance in each compartment, thereby reducing the electrical power consumption.

When at least one part of the anion exchanger is made of a II type anion exchange resin, the rate of removal of carbonate ions is improved. The II type anion exchange resin is strongly basic anion exchange resin including dimethyl ethanolamine as a functional group. The mixing ratio of the II type anion exchange resin is desirably about 5 to 15% by volume of the anion exchanger.

Raw water is introduced into. the desalting compartments 16. Product water is taken out from the desalting compartments 16. A part of the product water flows into the concentrating compartments 15 in a direction opposite to the flowing direction of the desalting compartments 16 i.e. in single-pass counter-flow manner. Water flowing out of the concentrating compartments 15 is discharged out of a system of the apparatus. The concentrating compartments 15 are provided with inlets on the same side of the outlets for the product water of the desalting compartments 16 and provided with outlets on the same side of the inlets for the raw water of the desalting compartments 16. Another part of the product water is supplied to the inlet of the anolyte compartment 17. Water flowing out of the anolyte compartment 17 is supplied to the inlet of the catholyte compartment 18. Water flowing out of the catholyte compartment 18 is discharged as waste water out of the system.

By introducing product water into the concentrating compartments 15 in the single-pass counter-flow manner relative to the desalting compartments 16, the concentrated water in the concentrating compartment 15 near the outlets for product water has the lowest ion concentration, whereby the ion diffusion to the desalting compartments 16 due to the concentration diffusion is restricted, and the ions are removed at a high rate. Especially, silica and boron ions are removed at an extremely high rate.

In case that the ratio of the anion exchanger is made higher in a nearer position to the inlet for the raw water, the alkaline strength of water in the desalting compartments becomes higher in a nearer position to the inlet for the raw water, and thus it becomes easy to dissociate silica and boron (boric acid), thereby improving the rate of removal of silica and boron.

Since the ion exchanger is filled in the concentrating compartments in the present embodiment of the invention, deionizing property can be ensured even when the line velocity (LV) in the concentrating compartments is 20 m/hr or less. The reasons will be described as follows. When a spacer is placed in each concentrating compartment, it is required to disperse condensed silica and condensed boron on membranes by water flow in the concentrating compartment. However, when the ion exchanger is filled in the concentrating compartments, ions are dispersed through the ion exchanger, thereby eliminating the necessity of high line velocity (LV).

Because the high line velocity is not necessary, the product water recovery can be higher than the conventional one even though the concentrated water flows in the single-pass manner. In addition, no circulation pump is required, whereby the apparatus can be more economical.

Though the filler for the concentrating compartments may be activated carbon to ensure required current, ion exchanger is preferably used rather than activated carbon because of the ion diffusion action as mentioned above. In this case, the anion exchanger and the cation exchanger are mixed preferably at an anion exchanger/cation exchanger volume ratio of 8/2 to 5/5 so as to reduce the electrical resistance.

In the electrodeionization apparatus shown in FIG. 1, a part of the product water is also supplied to the electrode compartments 17, 18. In order to ensure desired current, the electrode compartments 17, 18 are filled with ion exchanger, activated carbon, or metal as electric conductive media in the same manner as the concentrating compartments 15. This makes the applied voltage constant regardless of water quality. Therefore, even when high quality water such as ultra pure water is flowed, desired current can be ensured.

In the electrode compartments, particularly in the anolyte compartment, oxidizing agent such as chlorine and ozone are produced. Therefore, the filler is more preferably activated carbons for long-term use rather than ion-exchange resin. As shown in FIG. 1, it is preferable to feed product water having little or no Cl⁻ into the electrode compartments in view of long-term stabilization of the filler and the electrodes because production of chlorine in the electrode compartments is prevented.

The electrode compartments may not be filled with the aforementioned filler. For example, each electrode plate is provided, on a water flowing side, with a structure being porous so that electrode water permeates the porous portion. In this case, the electrode plates and the electrode compartments can be formed as an integral part, thereby facilitating the assembly.

When the electrodeionization apparatus is assembled, a salt type, for example, Na type or Cl type, ion exchanger is preferably employed as the ion exchanger and is packed in the compartment to be filled with the ion exchanger in such a manner that the volume of the salt type ion exchanger occupies 95 to 100% of the compartment. The salt type ion exchanger changes to a regeneration type, such as $H^+$ type or $OH^-$ type, ion exchanger by ion exchange with $H^+$ or $OH^-$, representively, after the electrodeionization apparatus starts to run, and the volume of the ion exchanger becomes larger. As a result, the compartments are fully filled with the ion exchanger and the ion exchanger wholly contacts to the ion-exchange membrane, thereby reducing the electrical resistance. The expansion of the ion exchanger also prevents formation of a shortcut (channel) for water in the compartment, and it contributes the production of product water having high quality.

When the concentrated water is circulated in the concentrating compartment the inside of which is not divided as shown in FIG. 1, the concentration of silica and boron should be higher near the outlets for product water. When concentrated water is circulated in a concentrating compartment the inside of which is divided as shown in FIGS. 3*a*, 3*b*, the concentration at the side near the outlet for the concentrating compartment is higher than that at the side near the outlet for the concentrating compartment so that the quality of product water is substantially equal to the quality of product water obtained in the single-pass counter-flow arrangement of FIG. 1.

Figure 3A:
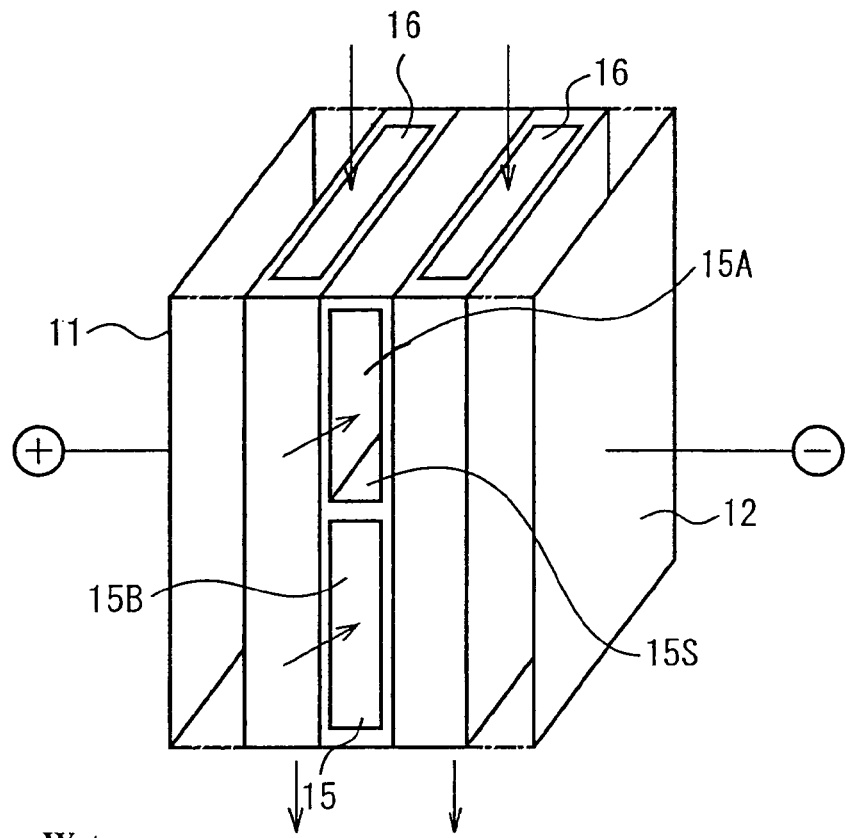
FIG. 3a is a perspective view schematically showing an electrodeionization apparatus according to another embodiment of the present invention.
Figure 3B:
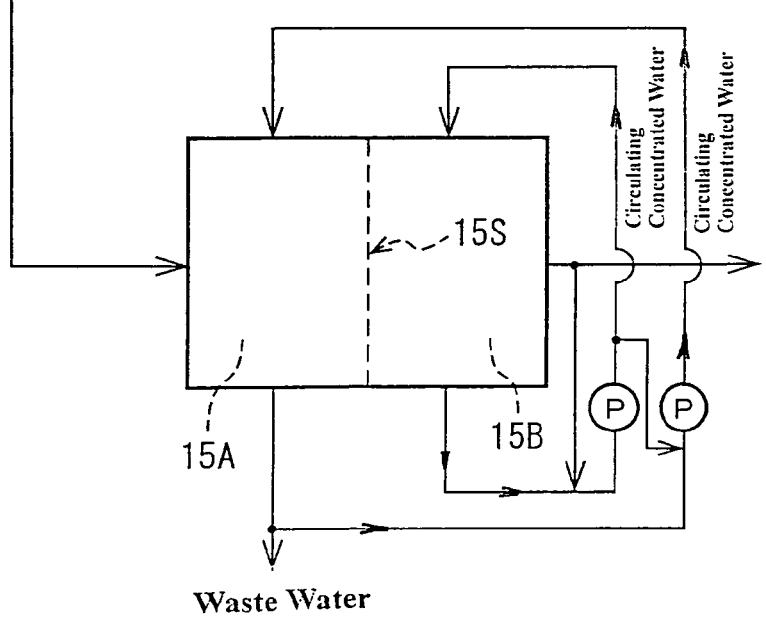

FIG. 3*a* is a perspective view schematically showing an electrodeionization apparatus according to another embodiment of the present invention, and FIG. 3*b* is a schematic flow diagram of the apparatus of FIG. 3*a*.

Electrodeionization apparatuses shown in FIGS. 3*a*, 3*b* have an anode 11 and a cathode 12. Cation-exchange membranes and anion-exchange membranes are alternately arranged between the anode 11 and the cathode 12 to define alternately a concentrating compartment 15 and desalting compartments 16. The concentrating compartment 15 is divided into two or more (two in FIGS. 3*a*, 3*b*) concentrated water flowing sections 15A, 15B by a partition 15S. The flowing direction of concentrated water in each concentrated water flowing section 15A, 15B crosses the flowing direction in the desalting compartments 16.

Each desalting compartment 16 has an inlet at the top and an outlet at the bottom in FIG. 3*a* so that water flows downwardly in a vertical direction.

The concentrating compartment 15 is provided with the partition 15S extending in a direction crossing the flowing direction in the desalting compartments 16. Although the direction is perpendicular to the flowing direction of the desalting compartments 16 in FIG. 3*a*, the term "perpendicular" includes a range of angle between 80-100°. The inside of the concentrating compartment 15 is divided into two stages which are arranged vertically in FIG. 3*a*, by the partition 15S. Water flows from the front to the back in FIG. 3*a* in the respective concentrated water flowing sections 15A, 15B.

As shown in FIG. 3*b*, a part of the product water flowed out of the desalting compartments is introduced into a circulatory system of the concentrated water flowing section 15B in which the circulation is conducted by a pump. The part of product water is thus circulated in the concentrated water flowing section 15B near the outlets for product water. A part of circulating concentrated water from the circulatory system is introduced into a circulatory system of the concentrated water flowing section 15A in which the circulation is conducted by a pump. The part of circulating concentrated water is thus circulated in the concentrated water flowing section 15A near the inlets for raw water. A part of circulating concentrated water from the concentrated water flowing section 15A near the inlets for raw water is discharged out of the circulatory system.

In the electrodeionization apparatus of FIGS. 3*a*, 3*b*, after a part of product water enters into a circulatory system of the concentrated water flowing section 15B near the outlet for product water and is circulated therein, a part of circulated water from the concentrated water flowing section 15B enters into a circulatory system of the circulated water flowing section 15A near the inlet for raw water, is circulated therein, and is discharged out of the circulatory system. This means that concentrated water is flowed from the side of the outlets for product water to the side of the inlets for raw water and, after that, is partially discharged out of the circulatory system. Accordingly, the apparatus exhibits the same effects as the case shown in FIG. 1 in which water in the concentrating compartment flows in the single-pass counter-flow manner relative to the desalting compartment.

There may be three or more concentrated water flowing sections defined by partitions in the concentrating compartment. In view of the increase in number of partitions or parts and complexity of the apparatus structure, the concentrating compartment is preferably divided into two or three concentrated water flowing sections.

The smallest possible thickness of the desalting compartment is preferable for removing not only silica but also boron in the electrodeionization apparatus. The thickness of the desalting compartment is preferably 5 mm or less. However, in view of water permeability and ease of manufacturing, the thickness is preferably 2 mm or more in practice.

According to the present invention, required current passes between the electrodes and silica and boron are removed at high rate while eliminating the influence of concentration diffusion. The required current passes in the apparatus having the above-described concentrating compartment and the electrode compartments. The current required for increasing the removal ratio of silica and boron is a current value corresponding to current efficiency of 10% or less. To obtain the removal ratio of silica and boron of 99.9% or more, the required current is a current value preferably corresponding to current efficiency of 5% or less. The current efficiency is expressed by the following equation:

Current Efficiency (%)=1.31·[flow rate per cell (L/min)]·[[equivalent conductivity of raw water (μS/cm)]−[equivalent conductivity of treated water (μS/cm)]]/current (A)

According to the electrodeionization apparatus of the present invention, required current can be ensured even when water having high resistivitly is fed as raw water into the electrodeionization apparatus and it is required to decrease further only silica and boron in the raw water. It should be noted that if no current flows in any one of concentrating compartments and electrode compartments in a conventional electrodeionization apparatus, current does not flow through the apparatus.

The apparatus of the present invention can remove silica and boron from raw water having high resistivity. Therefore, the electrodeionization apparatus of the present invention can treat various kinds of water.

For example, the electrodeionization apparatus can be employed as a primary pure water producing apparatus in a semiconductor plant. Even when product water produced by the primary pure water producing apparatus is consumed in small quantities and the remainder is returned to be circulated as raw water so as to make the raw water have high resistivity, required current can be ensured. Therefore, the apparatus can be stably started up.

Even when a plurality of electrodeionization apparatuses of the present invention are arranged in series and raw water is introduced in these apparatus, required current for the subsequent apparatus can also be secured.

The electrodeionization apparatus of the present invention can be employed also as a secondary pure water producing system called sometimes "sub-system" in an ultra pure water producing process. Even when water having resistivity of 10 MΩ·cm or more is fed as raw water into this apparatus, required current can be ensured. Therefore, the electrodeionization apparatus of the present invention can be employed as an alternative to a demminer (non-regenerative mixed-bed ion exchange apparatus).

As described above, in case that a salt type ion exchanger is packed in compartments when the electrodeionization apparatus is assembled, the ion exchanger expands after the electrodeionization apparatus starts to run. And thus a large stress is applied to the frames of the electrodeionization apparatus due to the expansion of the ion exchanger such that the frames are bulged sideward. In order to oppose the stress, reinforcing members are preferably attached to the side portions of the electrodeionization apparatus. An electrodeionization apparatus attached with reinforcing members will be described with reference to FIG. 4 through 9.

Figure 4:
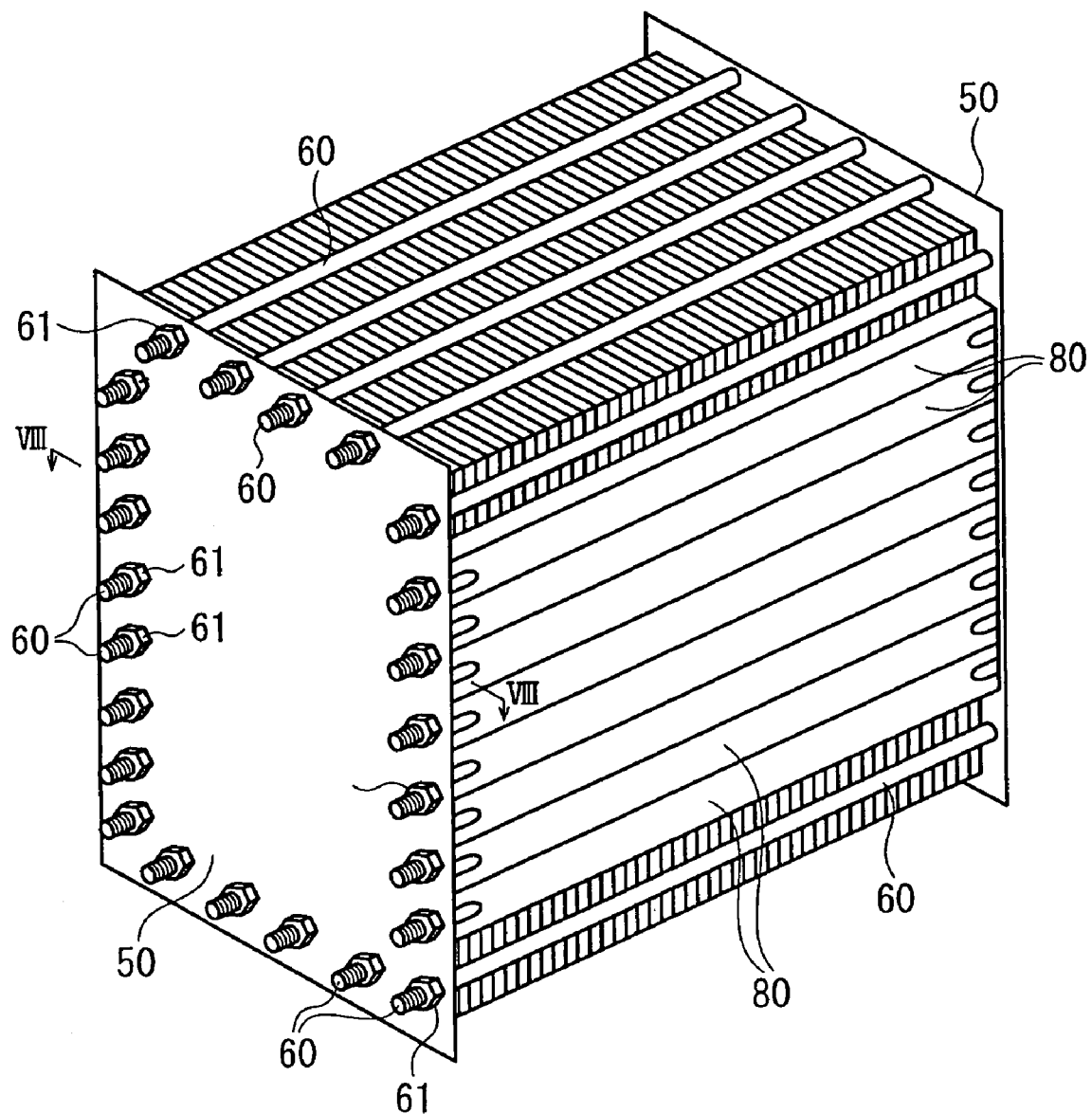
FIG. 4 is a perspective view schematically showing an electrodeionization apparatus according to further another embodiment of the present invention.
Figure 5:
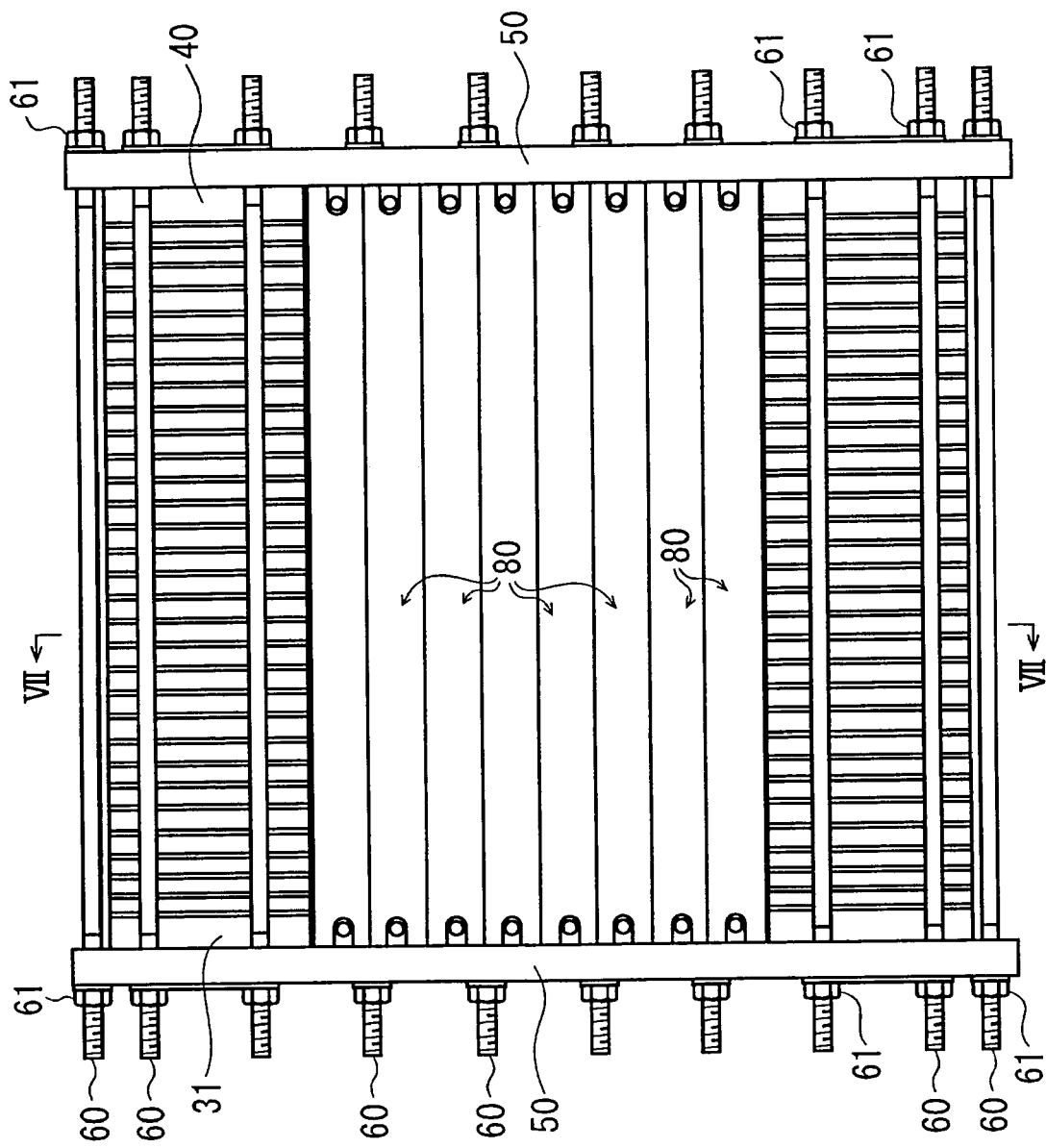
FIG. 5 is a side view of the electrodeionization apparatus of FIG. 4.
Figure 6:
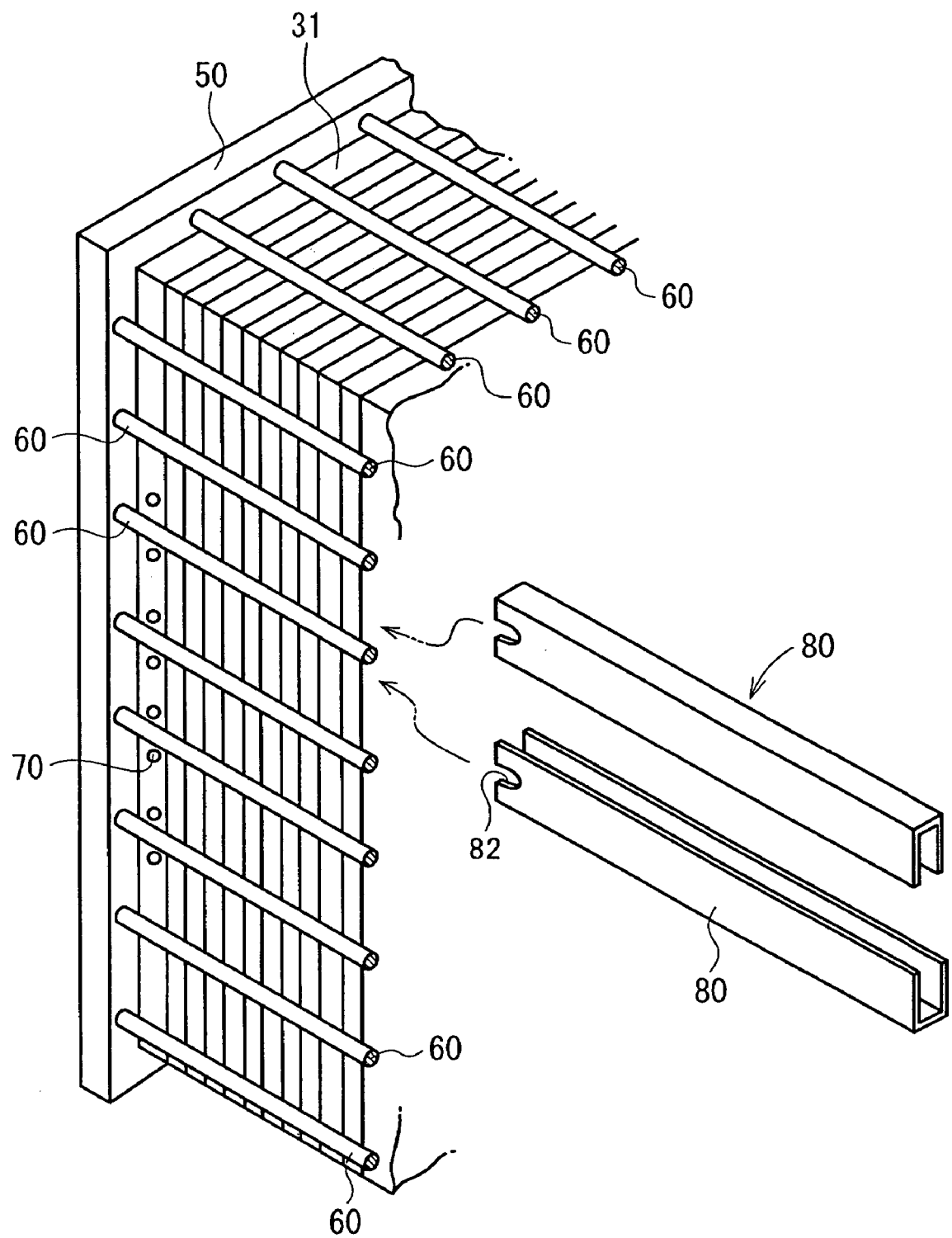
FIG. 6 is a perspective view of the end portion of the electrodeionization apparatus of FIG. 4.
Figure 7:
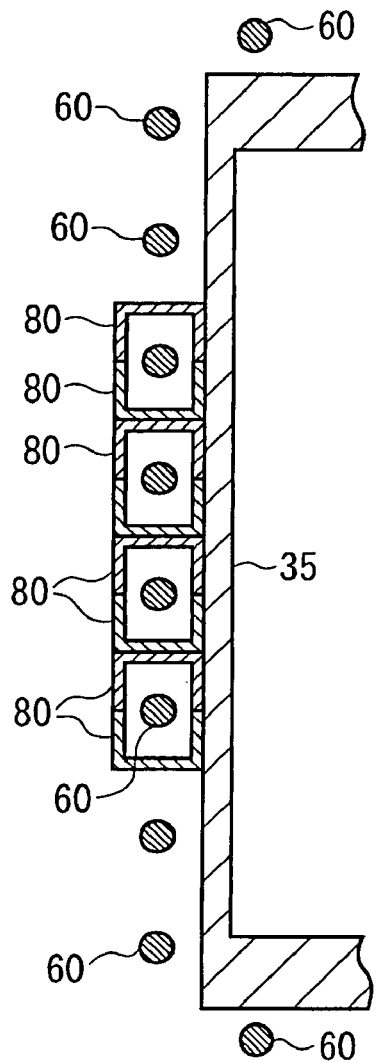
FIG. 7 is a cross sectional view taken along VII-VII line in FIG. 5.
Figure 8:
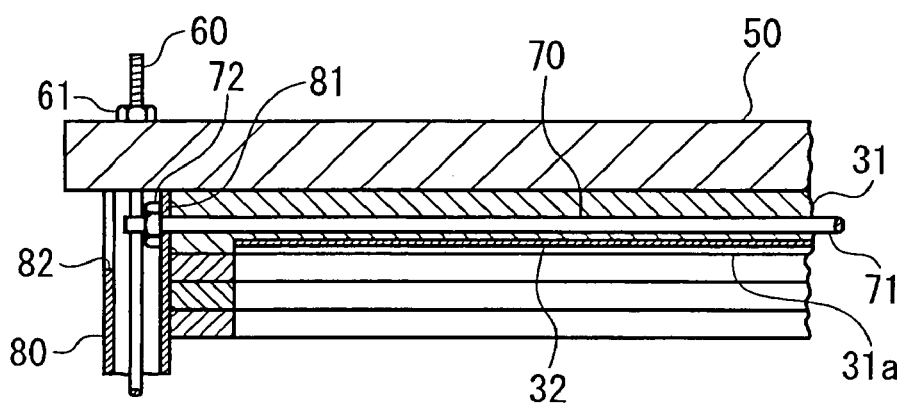
FIG. 8 is a cross sectional view taken along VIII-VIII line in FIG. 4.
Figure 9:
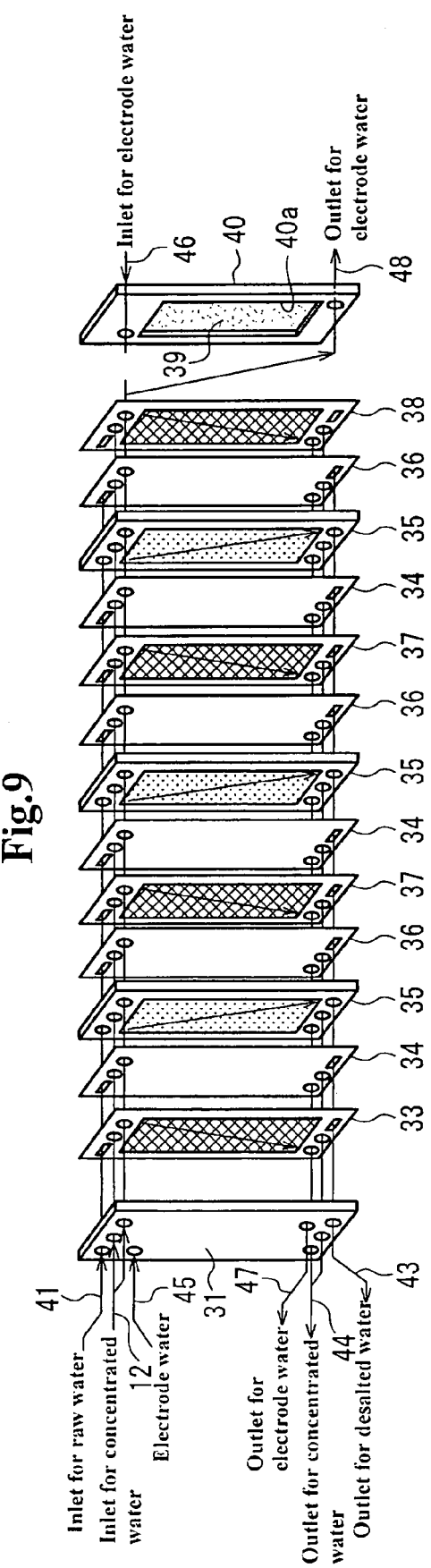
FIG. 9 is an exploded view of the electrodeionization apparatus of FIG. 4 showing the internal structure thereof.

FIG. 4 is a perspective view schematically showing an electrodeionization apparatus according to further another embodiment of the present invention, FIG. 5 is a side view of the electrodeionization apparatus of FIG. 4, FIG. 6 is a perspective view of the end portion of the electrodeionization apparatus of FIG. 4, FIG. 7 is a cross sectional view taken along VII-VII line in FIG. 5, FIG. 8 is a cross sectional view taken along VIII-VIII line in FIG. 4, and FIG. 9 is an exploded view of the electrodeionization apparatus of FIG. 4 showing the internal structure thereof.

A cathode compartment 31a (FIG. 8) is formed in the inside surface of a cathode base plate 31 in a shape of a shallow depression. A cathode 32 is disposed along the bottom of the cathode compartment 31a. A surrounding cathode spacer 33 is superposed on the periphery of the cathode base plate 31. A cation-exchange membrane 34 and a surrounding frame 35 for defining a desalting compartment, an anion-exchange membrane 36, and a surrounding frame 37 for defining a concentrating compartment are superposed on the cathode spacer 33 in this order. The cation-exchange membrane 34, the frame 35 for defining a desalting compartment, the anion-exchange membrane 34, the frame 37 for defining a concentrating compartment compose one unit. The apparatus is composed of a plurality of such units superposed together. That is, membranes 34, frames 35, membranes 36, and frames 37 are repeatedly superposed one unit over the other unit. A surrounding anode spacer 38 is superposed on the periphery of the last anion-exchange membrane 36 and an anode base plate 40 is superposed on the anode spacer 38. An anode compartment 40a is formed in the inside surface of the anode base plate 40 in a shape of a shallow depression. An anode 39 is disposed on the bottom of the anode compartment 40a.

End plates 50, 50 are superposed on the outermost surface of the laminates in direction of lamination, that is, on the outside surfaces of the cathode base plate 31 and anode base plate 40, respectively. The end plates 50, 50 are tied together at the peripheries thereof with tie-rods (tie-bolts, in this embodiment, both ends of which are threaded) 60 and nuts 61 tightened at the both ends of the tie-rods 60.

The inner space of each frame 35 is the desalting compartment, and the inner space of each frame 37 is the concentrating compartment. Raw water in the concentrating compartments is introduced into the desalting compartments through a raw water inlet line 41 and concentrated water is introduced into the concentrating compartments through a concentrated water inlet line 42. The raw water introduced into each desalting compartment flows through a layer filled with the ion-exchange resin whereby impurity ion in the raw water is removed so as to make the raw water to deionized water which flows out through a deionized water outlet line 43.

The concentrated water fed to the concentrating compartment captures impurity ions which pass through the ion exchange membranes 34, 36 while flowing down through the concentrating compartment, and flows out from a concentrated water outlet line 44. Electrode water is passed within electrode compartments through introducing lines 45, 46 and discharging lines 47, 48, respectively.

In this electrodeionization apparatus, reinforcing members 80 are attached to the side portions of the laminates composed of the frames 35, 37 in order to opposed the stress applied to the frames 35, 37 from the expanding ion exchanger. Each reinforcing member 80 is made up of an angle steel having a pair of wings extending from both sides of the central plate squarely, and an opening extending therealong between the wings. The reinforcing members 80 are laid between the base plates 31, 40.

That is, as shown in FIGS. 6 and 8, penetrations 70 are provided in the base plates 31, 40 across the width thereof. The tie-bolts 71 are inserted into the penetrations 70, respectively. The end of each tie-bolt 71 is inserted into an opening 81 at the end of each reinforcing member 80 and the nut 72 is tighten at the end of the tie-bolt 71, such that both ends of each reinforcing member 80 are fastened to the base plates 31, 40, respectively. The reinforcing member 80 is in contact with each lateral sides of the laminates consisting of the frames of the electrodeionization apparatus. The reference numeral "82" in FIGS. 6 and 8 represents a cutout provided in the reinforcing member 80 for tightening the nut 72.

The reinforcing members 80 of which the openings are directed downward and the ones of which the openings are directed upward are arranged alternately. The reinforcing member 80 of which the opening is directed downward and the one of which the opening is directed upward are combined together in such a manner that a space enclosed by the wings of both of them is formed. The above-mentioned tie-rod 50 is arranged in the space, respectively. When the electrodeionization apparatus is assembled, the tie-rods 50 are previously provided, and then the reinforcing members 80 are attached such that the reinforcing members 80 are laid across the base plates 31, 40.

In the present invention, the flow ratio of the desalting compartment to the concentrating compartment is preferable to be 9:1 to 7:3, so that the quality of deionized water can be improved and the rate of recovery of water also can be improved.

In the present invention, the current density is preferable to be 300mA/dm$^2$ or higher.

In the present invention, the temperature of water to be treated is preferable to be 15° C. or higher, particularly in a range of 25 to 40° C. When the frames, the ion-exchange membranes, ion-exchange resin, etc. have high resistance to heat, the temperature of water to be treated may be 40° C. or higher.

INDUSTRIAL CAPABILITY

As described above, according to the present invention, the electrodeionization apparatus produces high-purity product water in which both silica and boron are removed to a high degree. Conventional electrodeionization apparatuses could not sufficiently remove silica and boron.

What is claimed is:

1. An electrodeionization apparatus comprising:
   an anolyte compartment having an anode;
   a catholyte compartment having a cathode;
   concentrating compartments and desalting compartments wherein the concentrating compartments and the desalting compartments are formed between the anolyte compartment and the catholyte compartment by arranging alternately at least one anion-exchange membrane and at least one cation-exchange membrane;
   ion-exchanger with which the desalting compartments are filled;
   at least one of ion-exchanger, activated carbon, and electric conductor which fills the concentrating compartments;
   a device for introducing electrode water into the anolyte compartment and the catholyte compartment, respectively;
   a concentrated water introducing device for introducing concentrated water into the concentrating compartments;
   a device for feeding raw water into the desalting compartments to produce deionized water; and
   outlets formed at the desalting compartments for taking out the deionized water;
   wherein the outlets of the desalting compartments are connected to the concentrated water introducing device to introduce a part of the deionized water containing at least one of silica and boron at a lower concentration than the raw water and obtained from the desalting compartments into the concentrating compartments at a side near the outlets for the deionized water of the desalting compartments;
   the concentrated water introducing device makes the concentrated water flow out of the concentrating compartment at a side near an inlet for the raw water of the desalting compartment;
   at least a part of the concentrated water flows out of the concentrating compartments out of a circulatory system;
   the desalting compartments are filled with an anion exchanger and a cation exchanger in such a manner that anion exchanger/cation exchanger volume ratio becomes 8/2 to 5/5; and
   at least one part of the anion exchanger in the desalting compartment is made of a II type anion exchanger.

2. An electrodeionization apparatus as claimed in claim 1, wherein the concentrating compartments are filled with the ion exchanger,
   wherein the ion exchanger consists of an anion exchanger and a cation exchanger, and the anion exchanger and the cation exchanger are packed in the concentrating compartments in such a manner that the anion exchanger/cation exchanger volume ratio becomes 8/2 to 5/5.

3. An electrodeionization apparatus as claimed in claim 1, wherein 5 to 15% by volume of the anion exchanger consists of the II type anion exchanger.

4. An electrodeionization apparatus as claimed in claim 1, wherein the ratio of the anion exchanger becomes higher in a nearer position to the inlet for raw water in the desalting compartments.

5. An electrodeionization apparatus as claimed in claim 1, wherein the ion exchanger is a salt type ion exchanger before the electrodeionization apparatus starts to run and is filled in each compartment in such a manner that volume of the salt type ion exchanger occupies 95 to 100% of each compartment.

6. An electrodeionization apparatus as claimed in claim 1, wherein
   end plates are disposed on outermost both end sides out of the cathode or from the cathode to the anode respectively,
   the end plates are tied together with tie-rods at the peripheries thereof, and
   reinforcing members are disposed along at least one lateral side of the electrodeionization apparatus.

* * * * *